Jan. 17, 1956  J. E. SOCKE  2,731,136
CAN BODY CONVEYOR WITH HORN ALIGNING DEVICE
Filed Aug. 26, 1952
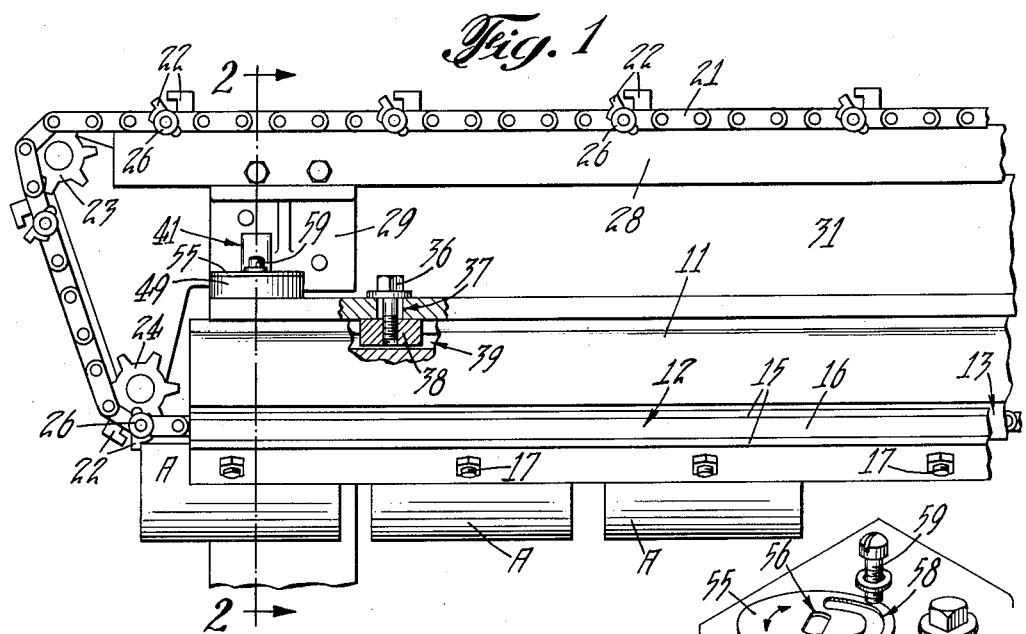
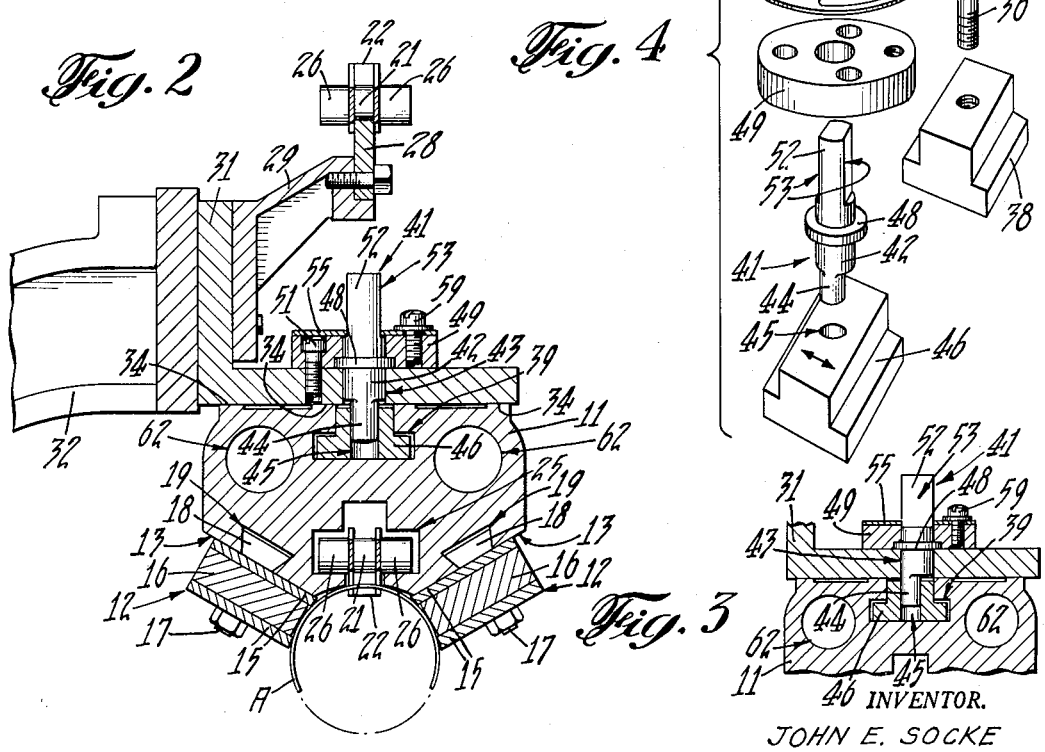
INVENTOR.
JOHN E. SOCKE
BY Charles H. Erne
Leland R. McCann
George W. Reifer
ATTORNEYS

United States Patent Office 2,731,136
Patented Jan. 17, 1956

2,731,136

CAN BODY CONVEYOR WITH HORN ALIGNING DEVICE

John E. Socke, Pelham Manor, N. Y., assignor to American Can Company, New York, N. Y., a corporation of New Jersey Application August 26, 1952, Serial No. 306,416

5 Claims. (Cl. 198—179)

The present invention relates to a can body treating machine having a longitudinal support for can bodies to be treated and has particular reference to devices for truing or aligning the support while in the machine. This is a companion application to my copending United States applications Serial Number 306,415 for Can Body Support with Conveyor Wearing Tracks, Serial No. 306,418 for Can Body Making Machine with Improved Body Support Member, both filed August 26, 1952, and United States application Serial Number 306,335 filed August 26, 1952 for Can Body Support with Adjustable Rails, in the name of Lloyd H. Weber.

In the soldering and other treatment such as wiping, strip coating, cooling, etc., of side seams of sheet metal can bodies, the bodies usually are advanced along a horn or mandrel which extends for substantially the full length of the machine. A necessary requirement for such treatments is that the horn be maintained in as nearly a straight line condition as possible so that the side seams of the can bodies advancing along the horn will be in proper alignment with the treating devices located at stations along the horn. Where considerable heat is used as part of a treatment, such as at a soldering station, considerable difficulty is sometimes experienced due to warping of the horn parts. Usually the horn in part, is secured to the machine frame by bolts in such a manner that by loosening the bolts, the horn may be realigned and reclamped in proper position by tightening the bolts.

Recently it has been found that an extruded horn or support member, preferably made of a soft material, such as aluminum, aluminum alloys, magnesium, etc., which can be readily extruded from a die, is much superior in many ways to support members made of relatively harder materials such as iron or steel. However such an extruded soft material is not suitable to the inclusion of screw threads which must be used frequently to provide for the realignment of the support member. The screw threads in such soft material readily wear or crumble away and are substantially destroyed after frequent use.

The instant invention contemplates overcoming this difficulty by the provision of a novel aligning device for such an extruded horn or support member.

An object of the invention is the provision in a can body treating machine having an extruded horn or support member, of a novel aligning device wherein the horn may be readily realigned while in the machine to maintain it in a substantially straight condition without the utilization of screw threads in the horn.

Another object is the provision of such a novel aligning device wherein the operation of the device results in a minimum amount of wear on the extruded horn member.

Numerous other objects and advantages of the invention will be apparent as it is better understood from the following description, which, taken in connection with the accompanying drawings, discloses a preferred embodiment thereof.

Referring to the drawings:

Figure 1 is a fragmentary side elevation of principal parts of a can body treating machine embodying the instant invention;

Fig. 2 is an enlarged transverse sectional view taken substantially along the line 2—2 in Fig. 1, with parts broken away;

Fig. 3 is a fragmentary view of certain of the parts shown in Fig. 2 with the parts in a different position; and Fig. 4 is a perspective exploded view of the parts of the novel aligning device used in the machine.

As a preferred or exemplary embodiment of the invention the drawings illustrate principal parts of a can body side seam soldering machine of the character disclosed in United States Patent 1,338,716 issued May 4, 1920 to Magnus E. Widell on Soldering Machine. In such a machine the can bodies to be treated are propelled along a straight line path of travel in a substantially continuous procession and in end-to-end spaced and timed relation, the can bodies being supported in an outside horn or mandrel for the various operations performed on them.

In the instant invention the drawings show an improved horn or mandrel unit which includes a one-piece extruded aluminum horn or support member 11 which extends longitudinally of the machine for its entire length. Can bodies A to be treated are held by magnetic attraction to a pair of converging permanent magnet support rails 12 which are secured to angularly disposed faces 13 on the bottom of the extruded horn member 11. Each rail 12 comprises a pair of spaced and parallel pole plates 15 with a core plate 16 disposed between them and secured together to provide a unitary structure. The rails 12 extend along the entire length of the horn member 11 and are secured to the horn member by bolts 17 which are attached to wedge blocks 18 seated in longitudinal dovetail grooves 19 formed in the angularly disposed faces 13 of the horn member. The rails 12 are disposed at a predetermined angle to each other so as to radially engage and hold the can bodies A in suspension.

The suspended can bodies A are propelled or advanced along the magnetic rails 12 in the usual spaced and processional order for treatment, by an endless chain conveyor 21 having conventional can body gripper dogs 22 secured thereto at spaced intervals along the chain for engagement behind each can body in the procession. The conveyor 21 operates over vertically spaced sprockets 23, 24 disposed at each end of the machine and is actuated in any suitable manner, preferably as shown in the above mentioned Widell patent.

The lower run of the conveyor 21 operates in a slot or track 25 (Fig. 2) of cruciform cross-section, formed in the bottom of the horn member 11 between the magnetic rails 12. Rollers 26 secured to both sides of the conveyor 21 adjacent the gripper dogs 22 ride on the opposed horizontal legs in part defining the slot 25 and thus support the conveyor, while the gripper dogs 22 depend below the horn member for engagement with and for propelling the can bodies along the horn member.

The upper run of the conveyor 21, intermediate the ends of the machine, rides on and is supported by a stationary support bar 28 which is disposed above the horn member 11 in vertical alignment and parallel relation with the conveyor track 25 in this member. The support bar 28 is secured to a plurality of small brackets 29 which are fastened to the vertical leg of an L or angle shaped beam 31 which extends the full length of the machine and which preferably is made of aluminum metal. The angle beam 31 is secured to a plurality of arms 32 which extend up from the frame of the machine at intervals along its length.

The angle beam 31 constitutes a rigid support for the horn member 11, the horn member being suspended from the bottom face of the horizontal leg of the angle beam. For this purpose the bottom face of the angle beam 31 is finished off smooth and straight for contact with bearing projections 34 on the upper face of the extruded horn member 11. The horn member 11 is held tightly in place against the lower surface of the angle beam 31, after alignment of the horn member, by a plurality of clamping screws 36 which are disposed at spaced intervals along the angle beam. In order to eliminate screw threads in the soft metal horn member 11, the clamping screws 36 extend through large clearance holes 37 (Fig. 1) in the angle beam 31 and are threadedly secured in relatively hard metal (such as iron or steel) T-shaped clamping blocks 38 (see also Fig. 4) disposed in a longitudinal T-slot or recess 39 formed in the top of the horn member 11 for its entire length.

Alignment of the horn member 11 to maintain it in a true straight condition is effected by aligning devices which are disposed one at each end of the horn member and one or more, as required, intermediate its ends. These devices are designed to shift the horn member 11 laterally into an aligned position, after which it is locked in this position by the clamping screws 36.

Each aligning device includes a rotatable aligning pin or element 41 which is disposed in a vertical position and is formed with a rotor body 42 carried for rotation in a bearing bore 43 in the horizontal leg of the angle beam 31. Below the rotor body 42, the aligning pin 41 is formed with a depending eccentrically disposed stud or eccentric 44 which is rotatable in a bore or aperture 45 of a T-shaped aligning block 46 disposed in the longitudinal T-slot or recess 39 in the horn member 11.

Above the rotor body 42, the aligning pin 41 is formed with an integral collar 48 which rests on the top face of the angle beam 31 and thus supports the aligning pin vertically. The collar 48 is rotatably retained against vertical displacement by a stationary surrounding and confining ring 49 which is permanently secured by screws 51 (Fig. 2) to the horizontal leg of the angle beam 31. The confining ring 49 preferably is made of a relatively hard metal such as iron or steel.

Above the confining ring 49, the aligning pin 41 is formed with a stem 52 having flat and parallel opposing faces 53 for the application thereto of a wrench or other tool for manually rotating the pin in its bearing bore 43. This stem 52 is surrounded by a locking plate 55 having a slot 56 of the shape of the stem, through which the stem projects and by which the plate is locked onto the stem for rotation therewith. The locking plate 55 is further formed with a semi-circular slot 58 through which a locking screw 59 extends. The locking screw 59 is threadedly engaged in the relatively hard metal confining ring 49 as best shown in Fig. 2. When the locking screw 59 is turned down tight against the locking plate 55, the plate is locked in position against rotation and it thus locks the stem 52 and the aligning pin 41 as a whole against rotation.

Hence when realignment of the horn member 11 is required, it is merely necessary to loosen the horn clamping screws 36 and the locking screws 59 and turn the locking stems 52 of the aligning pins 41 the required amount to shift the horn member laterally into desired aligned position. After such an adjustment, the horn member 11 is locked against displacement by retightening the locking screws 59 and the clamping screws 36. Since the screw threads which are utilized for this purpose are provided in the relatively hard metal clamp blocks 38 and the confining ring 49 they may be used indefinitely without damage to the soft metal extruded horn member. Such a manner of protecting the horn member 11 against wear or destruction, qualifies it for use in a machine of the character herein disclosed and makes it possible to take advantage of such a horn member that can be accurately extruded, so that the formation of the dovetail grooves 19, the conveyor track 25, the longitudinal T-slot or recess 39, and cooling conduits 62, may be effected simultaneously with the extruding of the horn member.

It is thought that the invention and many of its attendant advantages will be understood from the foregoing description, and it will be apparent that various changes may be made in the form, construction and arrangement of the parts without departing from the spirit and scope of the invention or sacrificing all of its material advantages, the form hereinbefore being merely a preferred embodiment thereof.

I claim:

1. In a can body treating machine, the combination of an elongated relatively soft extruded metal horn member for supporting can bodies to be treated while being advanced therealong, said horn member having therein a longitudinal recess portions of which are wider than the mouth thereof, a rigid support mounting for said horn member, means including a clamping member in the wider portion of said recess for securing said horn member to said support, an aligning member confined against rotation in said recess, and a rotatable member carried by said support and having an eccentric portion extending into said aligning member, whereby rotation of said rotatable member relative to said aligning member shifts the latter and said horn member laterally on and relative to said support for longitudinally aligning said elongated horn member for a can body treating operation.

2. In a can body treating machine, the combination of an elongated relatively soft extruded metal horn member for supporting can bodies to be treated while being advanced therealong, said horn member having therein a longitudinal recess portions of which are wider than the mouth thereof, a clamping member in the wider portion of said recess, a rigid support for suspending said horn member in clamped relation thereto, means extending through said support and into said clamping member for securing said horn member to said support, an apertured aligning member confined against rotation in said recess, and a pin rotatably mounted on said support, said pin terminating in an eccentric portion extending into the aperture in said aligning member, whereby rotation of said pin relative to said aligning member shifts the latter and said horn member laterally on and relative to said rigid support for longitudinally aligning said elongated horn member for a can body treating operation.

3. In a can body treating machine, the combination of an elongated relatively soft extruded metal horn member for supporting can bodies to be treated while being advanced therealong, said horn member having a longitudinal T-slot formed in the upper surface thereof, a rigid support for suspending said horn member in clamped relation thereto, a plurality of clamping blocks of relatively hard metal disposed against rotation in said T-slot, said clamping blocks having clamping screws engaged therewith and extended through clearance openings in said rigid support for clamping said horn member tightly to the under surface of said support, a plurality of apertured aligning blocks of relatively hard metal non-rotatably disposed in said horn member T-slot, and a plurality of aligning pins rotatably carried by said support and each having an eccentric portion engaging an aperture in a said aligning block for shifting said aligning blocks and said horn member laterally on and relative to said rigid support and realtive to said clearance openings for longitudinally aligning and straightening said horn member for a can body treating operation.

4. In a can body treating machine, the combination of an elongated relatively soft extruded metal horn member for supporting a procession of can bodies to be treated while being advanced therealong, said horn member having a longitudinal T-slot formed in the upper surface thereof, an elongated rigid support for said horn member and having longitudinally spaced clearance openings therein, a plurality of clamping blocks disposed in said horn member T-slot, said clamping blocks having clamping screws extending through said clearance openings in said rigid support for clamping said horn member tightly to said support, a plurality of apertured aligning blocks of T-shape and of relatively hard metal disposed against rotation in said horn member T-slot, a plurality of aligning pins rotatably carried by said rigid support and respectively having eccentric portions seated in the apertures of said aligning blocks, and means engageable with said aligning pins and secured to said rigid support for confining said pins against displacement from said support, whereby rotation of said aligning pins relative to said aligning blocks shifts the latter and said horn member laterally on and relative to said support and clearance openings for longitudinally straightening and aligning said horn member for the can body treating operation, said confining means being thereafter operable for locking said aligning pins and laterally adjusted horn member against further displacement.

5. In a can body treating machine, the combination of an elongated relatively soft extruded metal horn member for supporting can bodies to be treated while being advanced therealong, a conveyor for advancing the can bodies along said horn, said horn member having therein a longitudinal recess portions of which are wider than the mouth thereof, a rigid support mounting for said horn member, means including a clamping member in the wider portion of said recess for securing said horn member to said support, an aligning member confined against rotation in said recess, and a rotatable member carried by said support and having an eccentric portion extending into said aligning member, whereby rotation of said rotatable member relative to said aligning member shifts the latter and said horn member laterally on and relative to said support for longitudinally aligning said elongated horn member for a can body treating operation.

References Cited in the file of this patent

UNITED STATES PATENTS

| | | |
|---|---|---|
| 1,534,677 | Assmann | Apr. 21, 1925 |
| 2,039,338 | Nordquist | May 5, 1936 |
| 2,348,495 | Peterson | May 9, 1944 |
| 2,491,616 | Laxo | Dec. 20, 1949 |
| 2,660,969 | Woolford | Dec. 1, 1953 |